United States Patent
Gobburu et al.

(10) Patent No.: US 8,172,142 B2
(45) Date of Patent: May 8, 2012

(54) SYSTEM, METHOD AND APPARATUS FOR PLACING AND UPDATING INFORMATION IN A PERSONAL DIGITAL ELECTRONIC DEVICE FOR COMMUNICATION TO A BAR CODE SCANNER

(75) Inventors: Venkata T. Gobburu, San Jose, CA (US); Nagesh Challa, Saratoga, CA (US); Michel E. Gannage, Los Altos Hills, CA (US)

(73) Assignee: MoBeam Inc., Cupertino, CA (US)

( * ) Notice: Subject to any disclaimer, the term of this patent is extended or adjusted under 35 U.S.C. 154(b) by 299 days.

(21) Appl. No.: 12/322,703

(22) Filed: Feb. 5, 2009

(65) Prior Publication Data

US 2009/0194591 A1  Aug. 6, 2009

Related U.S. Application Data

(60) Provisional application No. 61/063,703, filed on Feb. 5, 2008.

(51) Int. Cl.
*G06K 7/10* (2006.01)
(52) U.S. Cl. ............. 235/454; 235/462.01; 235/462.46; 235/472.01; 235/487; 235/494; 340/539.1; 340/539.11; 340/555; 340/556
(58) Field of Classification Search ............. 235/462.01, 235/487, 494; 340/539.1, 539.11, 555, 556
See application file for complete search history.

(56) References Cited

U.S. PATENT DOCUMENTS

| | | | |
|---|---|---|---|
| 6,736,322 B2 | 5/2004 | Gobburu et al. | |
| 6,877,665 B2 * | 4/2005 | Gobburu et al. | 235/462.46 |
| 2003/0171096 A1 * | 9/2003 | Ilan et al. | 455/3.06 |
| 2005/0284933 A1 * | 12/2005 | McGill | 235/383 |
| 2008/0035734 A1 | 2/2008 | Challa et al. | |
| 2008/0128505 A1 | 6/2008 | Challa et al. | |

OTHER PUBLICATIONS

U.S. Appl. No. 61/063,703, filed Feb. 5, 2008, Gobburu, et al.

\* cited by examiner

*Primary Examiner* — Kristy A Haupt
(74) *Attorney, Agent, or Firm* — David H. Carroll (57) ABSTRACT

A personal digital electronic device is provided with two enhancements, namely (a) an IR receiver and associated circuitry and software/firmware for mimicking a laser scanner operation, so that information existing in physical form with an associated bar code may be entered into the personal digital electronic device at the point of transaction; and (b) a radio receiver and associated circuitry and software/firmware to receive and process RDS feeds, so that offers, coupons and promotions embedded in the RDS feeds may be detected and used to place or update information on the personal digital electronic device. The personal digital electronic device is enabled for communication with a bar code scanner preferably using the "active light" communication technology.

6 Claims, 8 Drawing Sheets

OFFERS INTERSPERSED & TRANSMITTED CONTINUOUSLY

SYSTEM, METHOD AND APPARATUS FOR PLACING AND UPDATING INFORMATION IN A PERSONAL DIGITAL ELECTRONIC DEVICE FOR COMMUNICATION TO A BAR CODE SCANNER

CROSS-REFERENCE TO RELATED APPLICATIONS

This application claims the benefit of U.S. Provisional Patent Application Ser. No. 61/063,703 filed Feb. 5, 2008, which hereby is incorporated herein in its entirety by reference thereto.

BACKGROUND OF THE INVENTION

1. Field of the Invention

This invention relates generally to communicating encoded information from a personal digital electronic device, and more particularly to systems, methods and apparatus for placing and updating Information in a personal digital electronic device for communication to a bar code scanner.

2. Description of the Related Art

The use of bar code scanners in a great many aspects of everyday life is commonplace. Bar code scanners are found in many different types of facilities, including supermarkets, airport security, check-in and boarding areas, stadiums, libraries, test centers, conference centers, and many other places. The use of bar code scanners has dramatically increased the speed at which many commonplace transactions can be completed.

Personal digital electronic devices are in widespread use. It is desirable that personal digital electronic devices of many different types be capable of use at any facility equipped with bar code scanners, and be capable of receiving new information and updating old information stored therein.

BRIEF SUMMARY OF THE INVENTION

One embodiment of the invention is a personal digital electronic device comprising a controller; a light transceiver coupled to the controller, the light transceiver having a transmitter stage and a receiver stage; and a memory coupled to the controller. The memory comprises program components executable by the controller for applying a scanning signal to the transmitter stage of the light transceiver to generate a scanning beam; capturing light reflected from a bar code exposed to the scanning beam with the receiver stage of the light transceiver; determining a bar code string from the captured reflected light; storing the bar code string in the memory; and transmitting the bar code string from the memory as active light.

Another embodiment of the invention is a personal digital electronic device comprising a controller; a broadcast band radio receiver coupled to the controller; a light source coupled to the controller; and a memory coupled to the controller. The memory comprises program components executable by the controller for receiving an information field comprising transmission information data from a radio data system ("RDS") transmission in a broadcast channel transmission; storing the transmission information data in the memory; and transmitting the transmission information data from the memory as active light from the light source.

Another embodiment of the invention is a method of operating a personal digital electronic device having a controller, a light transceiver coupled to the controller and having a transmitter stage and a receiver stage, and a memory coupled to the controller, the method comprising applying a scanning signal to the transmitter stage of the light transceiver to generate a scanning beam; capturing light reflected from a bar code exposed to the scanning beam with the receiver stage of the light transceiver; determining a bar code string from the captured reflected light; storing the bar code string in the memory; and transmitting the bar code string from the memory as active light.

Another embodiment of the invention is a method of operating a personal digital electronic device having a controller, a broadcast band radio receiver coupled to the controller, a light source coupled to the controller, and a memory coupled to the controller, the method comprising receiving an information field comprising transmission information data from a radio data system ("RDS") transmission in a broadcast channel transmission; storing the transmission information data in the memory; and transmitting the transmission information data from the memory as active light from the light source.

DETAILED DESCRIPTION OF THE INVENTION, INCLUDING THE BEST MODE

Communicating information in bar code form using "active" light from personal digital electronic devices to bar code scanners or readers is a powerful technology that has many applications. Personal digital electronic devices are electronic devices that can be easily carried on the person, and include such as mobile phones, personal digital assistants ("PDA"), gaming devices, audio and video players, convergence devices, fobs, and USB Flash drives. Personal digital electronic devices are suitable for many uses, including communications, entertainment, security, commerce, guidance, data storage and transfer, and so forth, and may be dedicated to a particular use or may be suitable for a combination of uses. The techniques described herein enable the large and growing population of personal digital electronic devices to use well established and widely adopted bar code standards to access the current commercial infrastructure, which is highly dependent on bar code scanners at points of sale. The same techniques may be used to access many other goods and services in addition to conventional commercial services. In effect, the personal digital electronic device may be made to appear as any physical item that might carry a bar code image, including a coupon, affinity card, drivers license, security card, airline boarding pass, event ticket, and so forth. Moreover, the interpretation is not limited to a bar code on a physical item, and may be used for any purpose that relies on communication of an identification code, and even for communication of other types of information including identity and credit information.

Many techniques may be used to place and update information on the personal digital electronic device; see, e.g., US Patent Application Publication No. US 2008/0035734 published on Feb. 14, 2008 (Ser. No. 11/891,950 filed Aug. 14, 2007, Challa et al., "Method and Apparatus for Communicating Information from a Mobile Digital Device to a Bar Code Scanner"), which hereby is incorporated herein in its entirety by reference thereto. Nonetheless, placing or updating information on the personal digital electronic device while at or near a point of transaction may still be challenging because of the personal and mobile aspects of the personal digital electronic device. While one technique for placing or updating information may be from the user's personal computer over a wired or wireless link to the personal digital electronic device, this is not a practical option away from the home. Another technique is to use the WiFi or cellular capabilities of the personal digital electronic device to place or update information, but some types of personal digital electronic devices may not have WiFi or cellular capabilities, and even if they do, the user may be in an area where WiFi and cellular are unavailable. Moreover, since some types of personal digital electronic devices lack keypads or any other manual input devices, information at a point of transaction that exists only in physical form with an associated bar code cannot be placed in the personal digital electronic device.

To solve these problems, a personal digital electronic device is provided with two enhancements, namely (a) an IR receiver and associated circuitry and software/firmware for mimicking a laser scanner operation, so that information existing in physical form with an associated bar code may be entered into the personal digital electronic device at the point of transaction; and (b) a radio receiver and associated circuitry and software/firmware to receive and process RDS feeds, so that offers, coupons and promotions embedded in the RDS feeds may be detected and used to place or update information on the personal digital electronic device.

The personal digital electronic device is enabled for communication with a bar code scanner preferably using the "active light" communication technology, which is described in a number of patents and patent applications, including US Patent Application Publication No. US 2008/0035734 published on Feb. 14, 2008 (Ser. No. 11/891,950 filed Aug. 14, 2007, Challa et al., "Method and Apparatus for Communicating Information from a Mobile Digital Device to a Bar Code Scanner"), which hereby is incorporated herein in its entirety by reference thereto; and U.S. Pat. No. 6,877,665 issued Apr. 12, 2005 (Challa et al., "System, Method and Apparatus for Communicating Information Encoded in a Light-Based Signal Using a FOB Device"), which hereby is incorporated herein in its entirety by reference thereto.

Personal digital electronic devices capable of communicating information in bar code form with active light are particularly well suited for capturing and redeeming offers, coupons, and promotions, as well as many other applications. Some illustrative applications are described in U.S. Pat. No. 6,736,322 issued May 18, 2004 (Gobburu et al., "Method and Apparatus for Acquiring, Maintaining, and Using Information to be Communicated in Bar Code Form with a Mobile Communications Device"), which hereby is incorporated herein in its entirety by reference thereto.

Some personal digital electronic devices have light sources that either are not capable of pulsing quickly enough, or the light sources are controlled by application program interfaces ("API") that for any number of technical or business reasons cannot be modified to pulse the light source as necessary. Some types of personal digital electronic devices such as mobile phones incorporate Near Field Communications ("NFC") technology and run NFC applications for engaging in transactions at only a limited number of points of sale equipped for the technology, but are otherwise not capable of engaging in transactions at points of sale. Some types of personal digital electronic devices may not have any light sources at all, even though they are capable of receiving or storing information of a type that could usefully be communicated to a bar code scanner. Personal digital electronic devices that are unable to communicate information to a bar code scanner with light may be enabled to do so by the use of an accessory, as described in US Patent Application Publication No. US 2008/0128505 published on Jun. 5, 2008 (Ser. No. 11/998,690 filed Nov. 30, 2007, Challa et al., "System, Method and Apparatus for Communicating Information from a Personal digital electronic device"), which hereby is incorporated herein in its entirety by reference thereto.

Scanner Enhancement

There are many instances where being able to capture a printed barcode to a personal digital electronic device would be advantageous, such as, for example, to input personal information from loyalty cards, library cards, and the like; and to "cut out" a coupon from a Free Standing Insert ("FSI"). Advantageously, a personal digital electronic device may be enhanced to mimic a laser scanner operation for such purposes.

Figure 1:
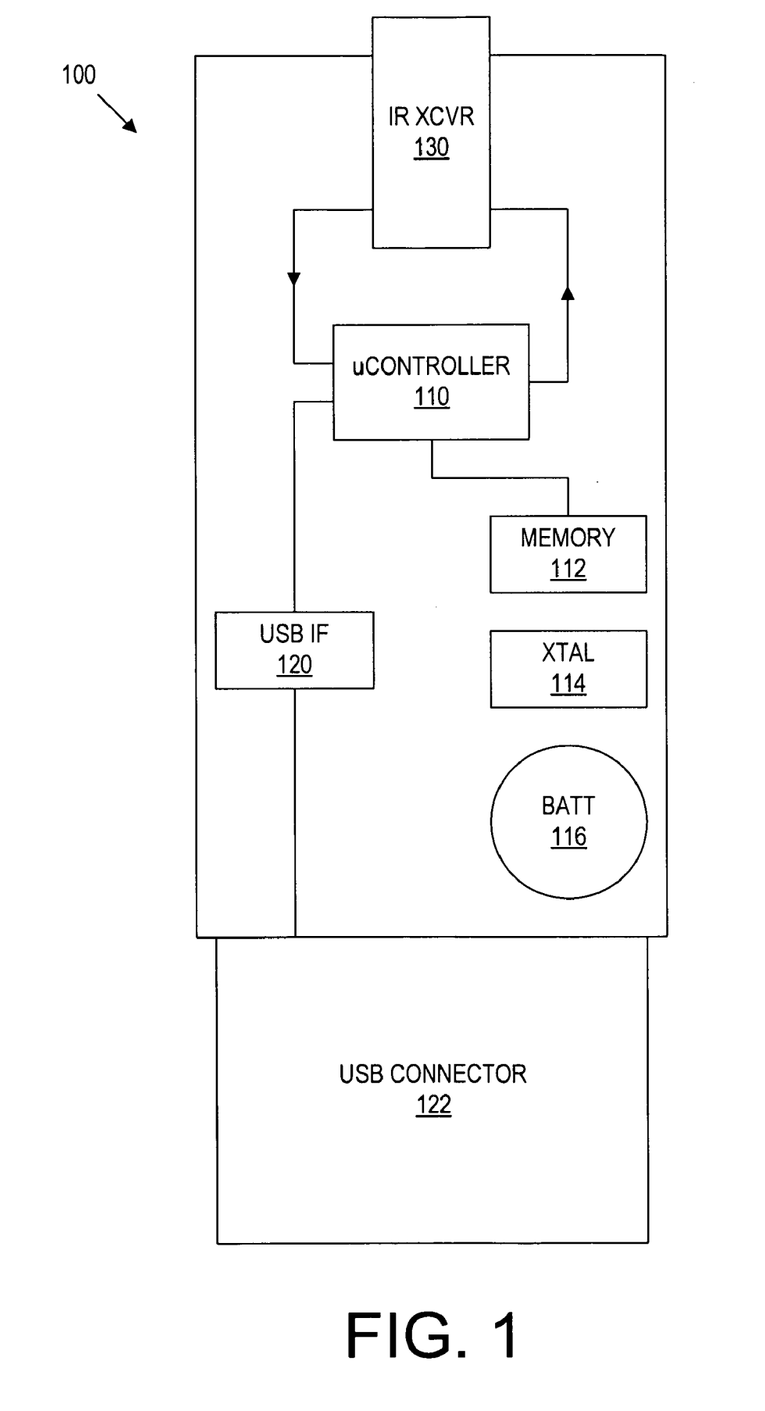
FIG. 1 is a schematic block diagram of a circuit suitable for a personal digital electronic device, illustratively a fob, having a scanner mimicry capability.

An example of one type of a suitably enhanced personal digital electronic device, illustratively a fob 100, is shown in FIG. 1. The fob 100 includes a controller, illustratively a simple microcontroller 110, for controlling its various functions, although any type of controller ranging from a logic circuit to an advanced processor may be used if desired. Information to be communicated in bar code form is processed as needed in the microcontroller 110 to generate a simulated signal, which is applied from an output port of the microcontroller 110 to the transmitter stage of an IR transceiver 130, which includes a driver and one or more LED's so that the simulated signal is transmitted as light, preferably in the infrared or "IR" range. A USB interface circuit 120 and connector 122 are provided so that information may be exchanged between the fob 100 and an external device such as a personal computer. The fob 100 also includes a memory 112, clocking crystal 114, and a battery 116.

Figure 2:
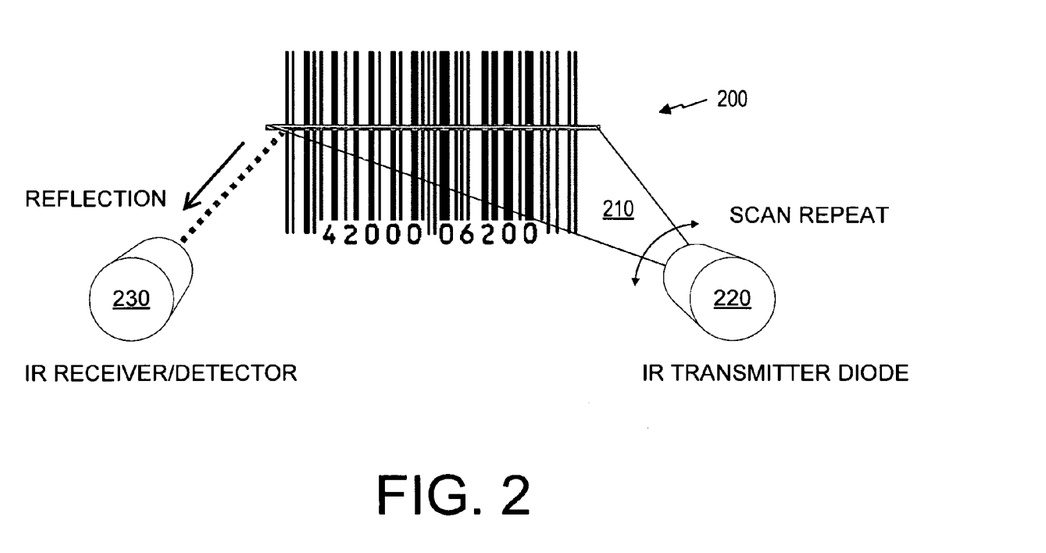
FIG. 2 is a schematic diagram of a scanning mimicry operation.

The transmitter stage and the receiver stage of the IR transceiver 130 may be used together to mimic a laser scanner operation for the purpose of capturing a printed barcode to the personal digital electronic device, illustratively in FIG. 1 the fob 100. As shown in FIG. 2, under control of the microcontroller 110, a beam 210 is generated in the LED 220 of the IR transceiver 130 as the user repeatedly sweeps the beam 210 across a bar code 200 to effect a scanning of the bar code. The scanning operation may be made automatic by the use of well known mechanical or phased array techniques, if desired. As the scan is in progress, the receiver stage 230 of the IR transceiver 130, which includes a sensor, amplifier, and A/D converter, captures the light reflected from the bar code 200 and submits the data to the microcontroller for determination of the bar code string. Since light is reflected from a space and little light is reflected from a bar, the bar code string may be determined from the pattern of bright and dim light detected by the IR transceiver 130, in a manner well known in the art.

RDS Enhancement

Radio Data System ("RDS") is a standard for sending small amounts of digital information using conventional FM radio broadcasts. The RDS system standardizes several types of information transmitted, including time, track/artist info and station identification. RDS has been standard in Europe and Latin America since the early 1990s, but less so in North America. There are a growing number of RDS implementations in portable and navigation devices thanks to lower priced, small footprint solutions.

Figure 3:
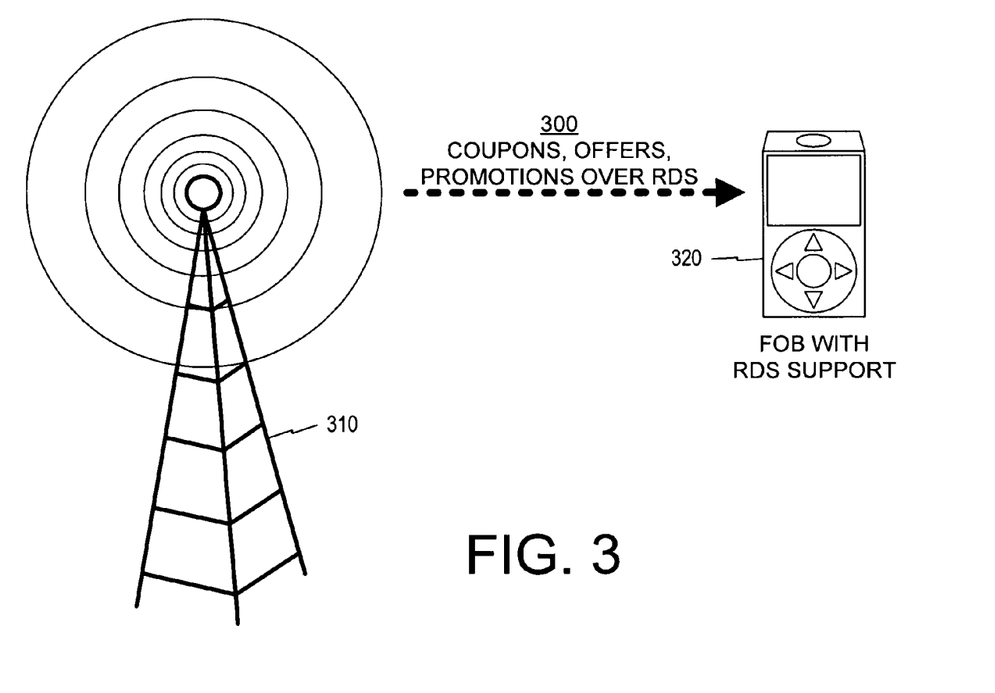
FIG. 3 is a schematic diagram showing a RDS distribution to a personal digital electronic device, illustratively a fob.

Information to be communicated in bar code format using light may be provided to a personal digital electronic device using RDS. FIG. 3 shows a system in which information 300, illustratively coupons, offers and promotions, is provided over RDS from a broadcaster 310 to a fob 320. The broadcast qualities of content delivery via RDS are favorable, in that the technique involves extremely low cost yet has a wide reach. Moreover, the user experience is greatly simplified. A personal computer, WiFi node, or mobile phone is not needed to deliver barcode based content to a personal digital electronic device. Moreover, no extra steps are needed to receive barcode based content; specifically, there is no need to download from a website, or to process an email or SMS.

Figure 4:
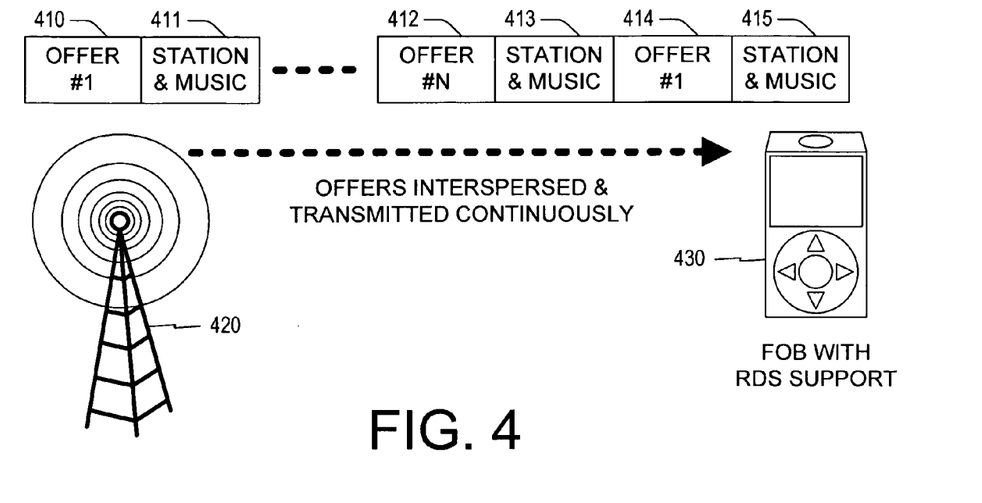
FIG. 4 is a schematic diagram showing RDS information fields.
Figure 5:
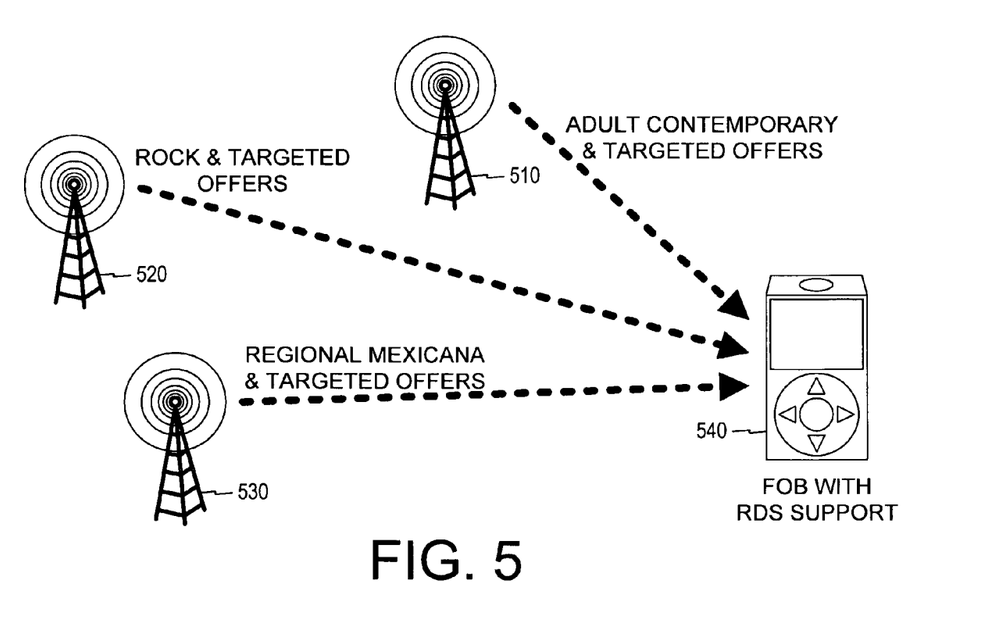
FIG. 5 is a schematic diagram showing multiple RDS distributions to a personal digital electronic device, illustratively a fob.
Figure 6:
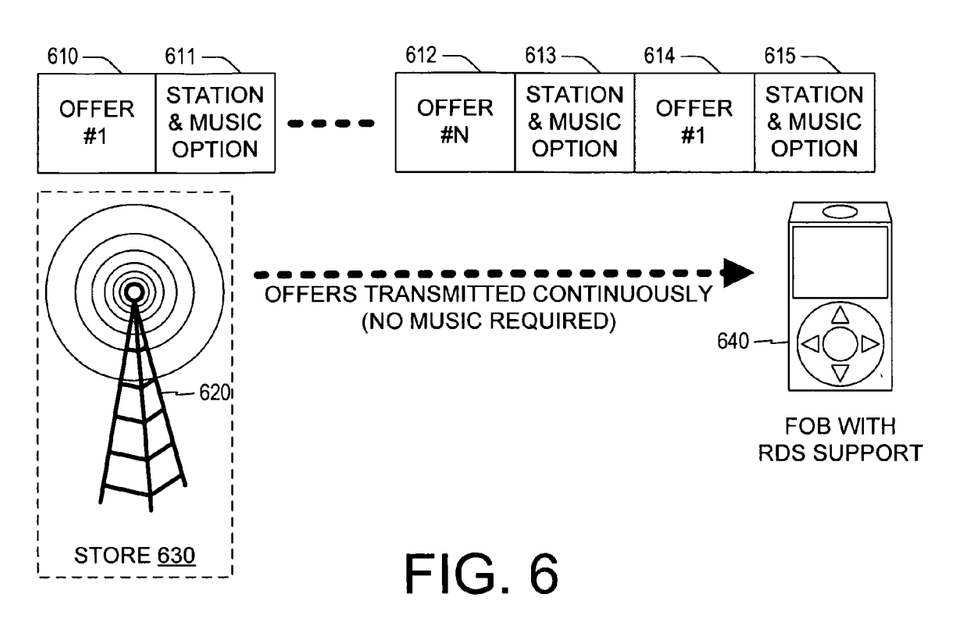
FIG. 6 is a schematic diagram showing a RDS distribution to a personal digital electronic device, illustratively a fob, over a low power channel.

FIG. 4 shows how certain content, illustrative a number of different offers 410, 412 and 414, may be placed into a personal digital electronic device, illustratively a fob 430 equipped with light communication capability such as the MoBeam® technology available from Ecrio Inc. of Cupertino, Calif., USA. When provided with RDS support, the fob 430 is able to receive offers that are interspersed in the radio signal and transmitted continuously by a broadcaster 420. The current RDS information fields such as AF, CT, PI, PTY, RT and TA are extended to accommodate an offers/promotions information field which the fob 430 is able to decode. As shown in FIG. 5, different radio stations such as 510, 520 and 530 may broadcast different offers and promotions, depending on the preferences of their target demographics. The radio stations may broadcast respective music genres and offers that cater to their target demographics. The fob 540 is able to receive one or more of the transmissions. As shown in FIG. 6, a low power station 620 at a particular store or location 630 may broadcast offers and promotions for their micro-audiences, which are able to receive the offers and promotions using personal digital electronic devices such as fob 640. The offers and promotions may be transmitted continuously, with or without interspersed music; i.e. music interspersing is optional and not required.

A personal digital electronic device may continuously "listen" to all RDS transmissions on one or more channels, as desired. Specifically, the personal digital electronic device may be programmed to listen to just one station, to scan over a set of favorite stations, or to scan over all radio stations in the area. The personal digital electronic device extracts the offers and promotions. If desired, the personal digital electronic device may apply a filter to extracted only those offers and promotions that match preset criteria, such as, for example, Sony HDTV, Weekly Specials, Ethnic Foods, and so forth. If desired, the personal digital electronic device may mark each downloaded offer or promotion with indentifying indicia, such as the date, time, and broadcasting radio station. If desired, the personal digital electronic device may track the offer and promotion activity, such as views, use, reuse, shared with, and so forth. This information may be accessed from the fob for later use, if desired.

The RDS enhancement may be used with Near Field Communications ("NFC") technology and NFC applications for engaging in transactions at those points of sale equipped for the technology. A NFC-enabled fob that has RDS support may be used to redeem offers and promotions, for example. Since NFC allows for two way communication with the point of sale ("POS") terminal, details of the redemption, such as name of offer, successful/unsuccessful redemption, date/time of redemption, and so forth, can be saved and uploaded when the fob can sync back to the barcode server using NFC.

Due to the widespread use of fobs in everyday life, fobs are an ideal platform for the RDS enhancement. Consider the automobile scenario. Increasingly, a large number of cars use fob's for such things as keyless entry and ignition keys. The traditional automobile fob may be enhanced with active light communication and RDS functionality, which would enable the traditional automobile FOB to be a viable end point to receive offers and promotions over RDS for redemption at points of sale.

Even mobile phones are suitable platforms for the RDS enhancement. An increasingly large number of mobile phones such as the Nokia N6031, the Nokia N5700, and the Sony Ericsson W580i, have an FM radio integrated and therefore are inherently capable of supporting RDS. Moreover, an increasingly large number of mobile phones are being RDS enabled. All of these phones can be effective endpoints to receive offers and promotions sent over FM.

Figure 7:
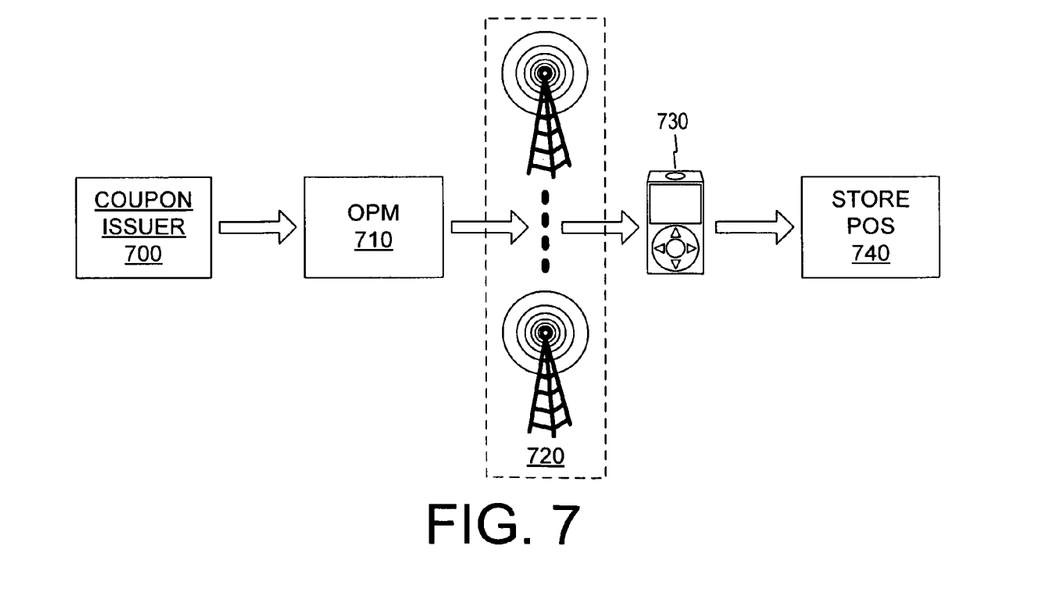
FIG. 7 is a schematic diagram of a coupon distribution scheme.

FIG. 7 shows an illustrative coupon distribution scheme. A coupon issuer 700 (there may be many such coupon issuers) provide coupon information to an offers and promotions manager indicated as OPM 710 in the figure. The offers and promotions manager OPM 710 provides offers and promotions (including coupons) to a number of different radio stations 720, depending on arrangements made with the radio stations 720. The broadcasts of the various radio stations include the RDS offers and promotions information fields, which are decoded by a fob 730 for use at a store POS 740. While feedback paths are not shown, they may be provided if desired.

Figure 8:
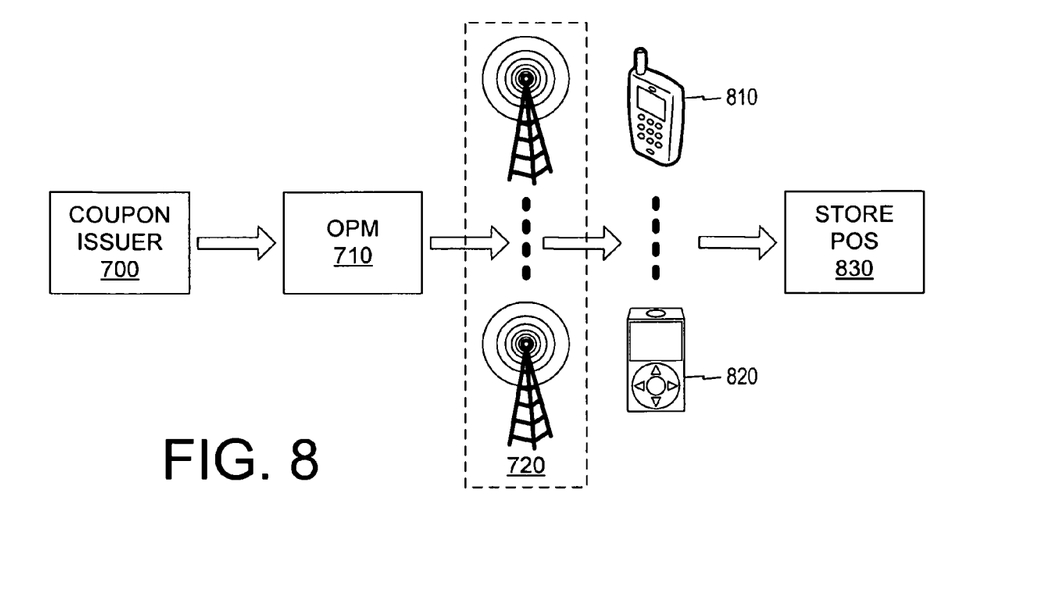
FIG. 8 is a schematic diagram of another coupon distribution scheme.

FIG. 8 shows an illustrative coupon distribution scheme that is a variation of the FIG. 7 scheme. Personal communications devices 810, illustratively a mobile phone 810 and a fob 820, include RDS support and are NFC-enabled and active light enabled using the MoBeam technology. This provides for redemption endpoint flexibility, in that any of a variety of different types of personal digital electronic devices may be used at a variety of different store POS's, since the store POS 830 may be either a traditional laser scanner terminal or a NFC enabled terminal. Advantageously, there is no change needed in the RDS infrastructure for distribution. As discussed with respect to FIG. 7, for example, the coupon issuer 700 provides coupon information to an offers and promotions manager OPM 710, which in turn provides the offers and promotions (including coupons) to a number of different radio stations 720, depending on arrangements made with the radio stations 720. The broadcasts of the various radio stations include the RDS offers and promotions information fields.

Figure 9:
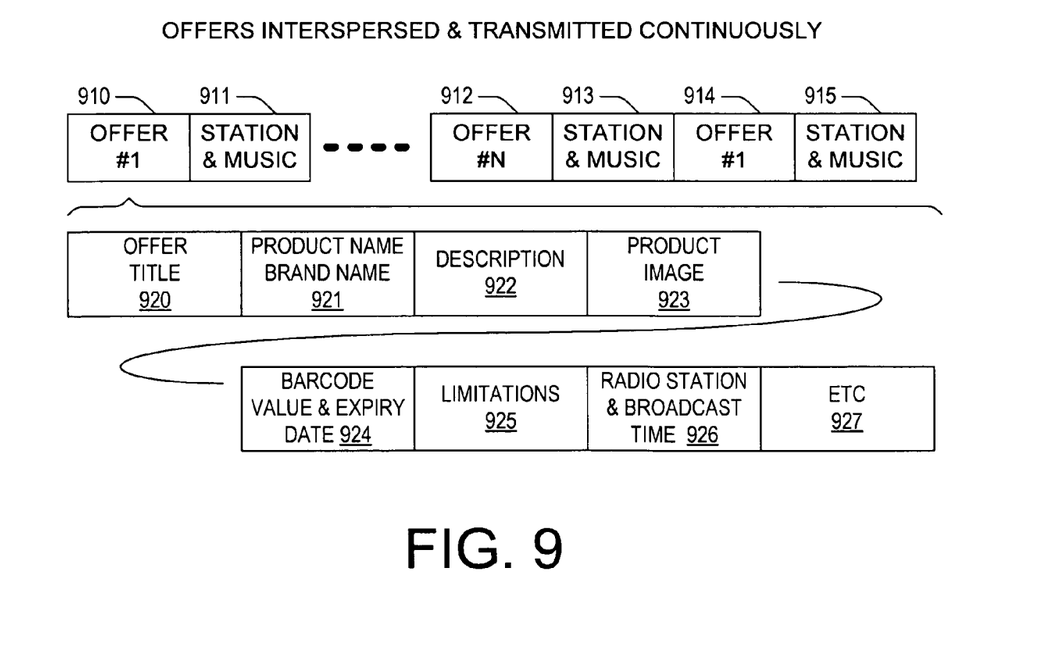
FIG. 9 is a schematic diagram showing RDS information fields.

FIG. 9 shows an illustrative construction of the offer. Offers 910, 912 and 914 are interspersed among station identifiers and music 911, 913 and 915 and transmitted continuously. Each offer in this example consists of multiple fields, some of which are mandatory and other optional. Examples of mandatory fields are Title 920 and Barcode Value 924. An example of an optional field is Product Image 923. Other fields may be mandatory or optional, as desired, including Product and Brand Name 921, Description 922, Expiry Date 924, Limitations 925, Radio Station and Broadcast Time 926, and so forth (Etc. 927).

Technique for Communicating Bar Code Information with Light

Figure 10:
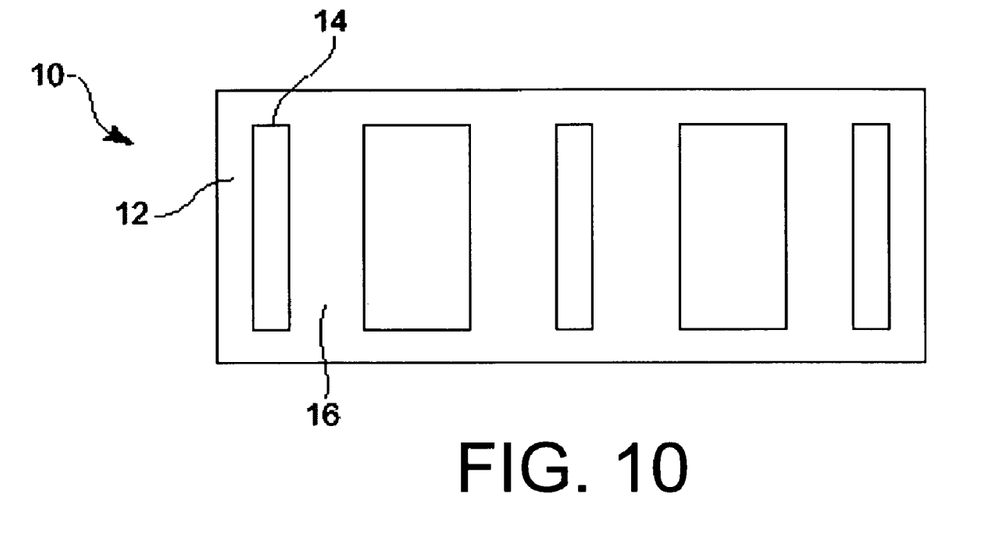
FIG. 10 is a plan view of an illustrative one-dimensional bar code.

FIG. 10 shows a bar code 10 that utilizes a series of vertical lines, i.e., bars 14, and spaces 16 to represent an identification code. Different combinations of the bars and spaces may be used to represent different characters.

Conventional bar code scanners include sequential bar code scanners and charge-coupled device ("CCD") bar code scanners. One type of sequential bar code scanner uses a scanning beam, typically narrow band light in the visible spectrum such as red laser, but potentially any bandwidth of light in the visible or infrared spectra, to pass over a sequence of bars and spaces such as bar 14 and space 16 sequentially, e.g., left to right and/or right to left. Another type of sequential scanner is a wand scanner, which is swept across the bar code by a user to create the scanning beam. As the scanning beam of light scans across the bar code 10, the beam is at least partially reflected back to the scanner by the spaces 16 and is at least partially absorbed by the dark bars 14. A receiver, such is a photocell detector, in the bar code scanner receives the reflected beam and converts the beam into an electrical signal. As the beam scans across the bar code, the scanner typically creates a low electrical signal for the spaces 16, i.e., reflected beam, and a high electrical signal for the bars 14, i.e., where the beam is absorbed. However, the scanner may create a low electrical signal for the bars 14 and a high electrical signal for the spaces 16 if desired. The width of the elements determines the duration of the electrical signal. This signal is decoded by the scanner or by an external processor into the identification code that the bar code represents.

The CCD type scanner takes a digital image of the bar code, and decodes the digital image using software that is well known in the art to convert the elements into the identification code.

While a bar code may be displayed on the screen of a personal digital electronic device, many of these screens are not suitable for this purpose. In the sequential-type scanners and the CCD-type scanners, the contrast between the bar and space elements is used to distinguish the elements and decode the bar code. However, the screens of many types of personal digital electronic devices, such as the LCD screen of a PDA or a cell phone, for example, tend to have low contrast between the gray "off" state designating a space of the bar code and the black "on" state designating a bar, relative to the contrast that is present in a bar code printed on a black-and-white label. This lower contrast between the elements of the bar code displayed on a screen can result in a lower reliability of the decoding process. Moreover, many types of personal digital electronic devices have extremely small screens or no screens at all.

Figure 11:
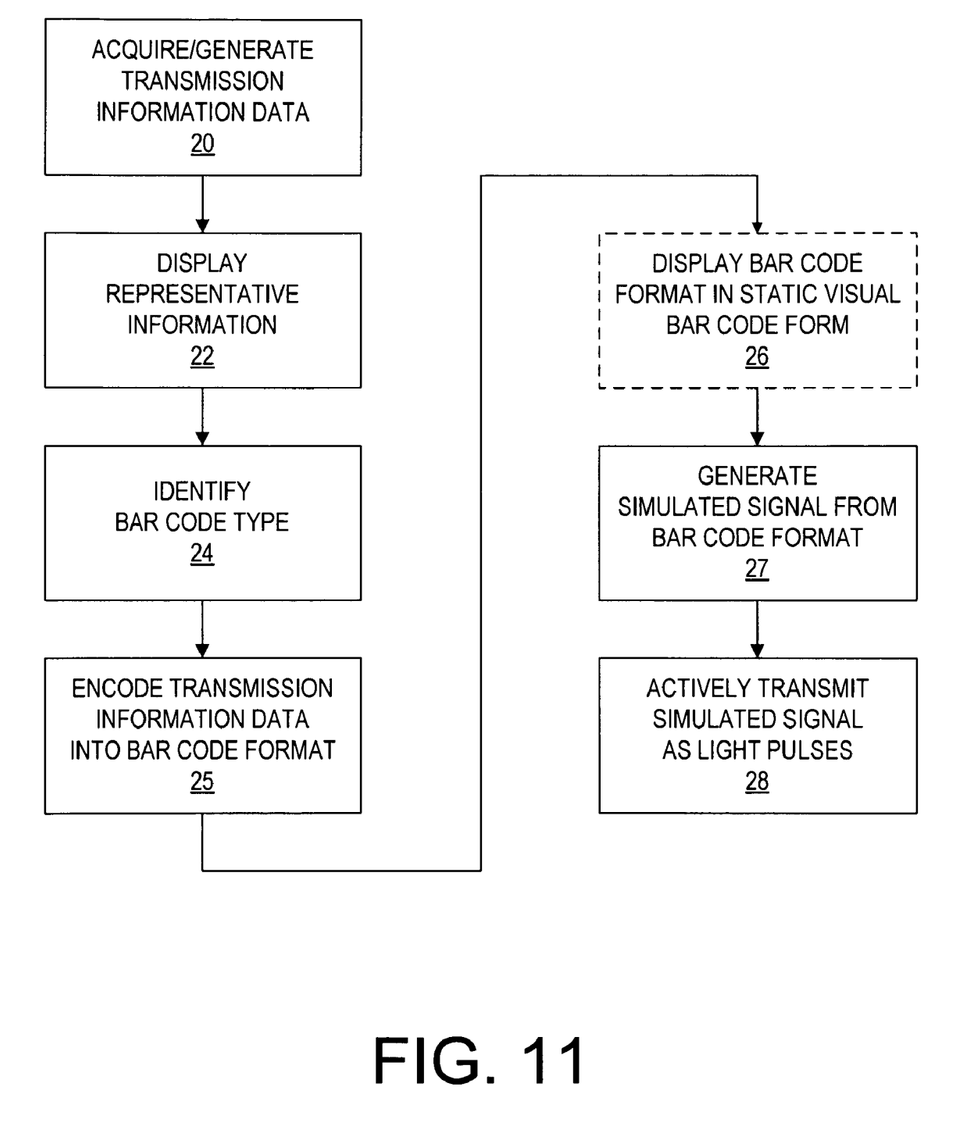
FIG. 11 is a flow chart of a method of actively providing transmission information data to a bar code scanner.

FIG. 11 shows a method of generating a signal for use with a sequential bar code scanner that simulates a bar code with light pulses. The method of FIG. 11 is particularly useful for sequential bar code scanners that use the reflection of a scanning beam being moved over a bar code. In block 20, transmission information data is acquired or generated. The transmission information data may be any type of data that one may wish to communicate while at a facility equipped with a bar code scanner, including information conventionally communicated using bar codes, as well as other types of information that are not conventionally communicated using bar codes because of, for example, physical limitations imposed by the bar code format. The transmission information data, for example, may include numeric, alphabetic, or alphanumeric data, an index, or other data values. The transmission information data may represent, for example, identification codes, boarding pass information, e-ticket information, ticket information, credit card information, debit card information, automated teller machine card information, identification information, account information, electronic payment information, wire transfer information, purchase information, security information, affinity information, and so forth.

The transmission information data may be stored locally on the personal digital electronic device, such as in random access memory ("RAM") or read only memory ("ROM"), or acquired from a remote source. The personal digital electronic device may include, for example, static or dynamic RAM ("SRAM" or "DRAM," respectively) memory, FLASH memory, other types of memory known in the art, or indeed any other type of memory. The transmission information data may be programmed into the device, entered into the device by the user, or received by the device from a remote source over any known communication technology such as wireless transmission, universal serial bus ("USB") transmission, parallel transmission, and serial transmission. The remote source may be a personal computer, a wireless operator, a server networked to the wireless operator, a peer networked to the wireless operator, a wireless data port, and so forth.

In block 22, representative information for the transmission information data that will identify the transmission information data to a user of the personal digital electronic device is presented on an output facility of the device. The output facility may include, for example, a display such as an LCD screen of a PDA or wireless telephone, a speaker, or any other output device for communicating with a user. The representative information may include the transmission information data itself, or may be other information that the user will associate with the transmission information data. In order to identify the desired transmission information data item, the representative information that will identify that transmission information data item may be rendered, for example, in a textual, numerical, and/or graphical form and displayed on a screen of a suitably equipped personal digital electronic device, or an audio, video or multimedia message that is played by a suitably equipped personal digital electronic device. Boarding pass information may be displayed on a screen of a mobile phone, for example, identifying the airline, the flight and seat numbers, the date and departure time of the flight, and the gate number. In this manner, the user of the personal digital electronic device can identify the transmission information data that is to be presented, is being presented, or has been presented to the bar code scanner. If multiple transmission information data items are stored locally on the device and/or remotely retrieved, for example, the user can scan through them and select the appropriate transmission information data item to be presented to the bar code scanner.

If the personal digital electronic device lacks a screen or if the screen is too small, the representative information may be presented in other ways, such as by a spoken message or patterns of tones. Alternatively, the representative information need not be displayed.

In block 24, a bar code type is identified. The bar code type may be any type of barcode known in the art, such as, but not limited to, a UPC, EAN, Interleaved 2 of 5, Code 93, Code 128, and Code 39, or specially designed bar code types.

In block 25, the transmission information data is encoded into a bar code format for the identified bar code type. The bar code format may be represented, for example, by a binary array. In a typical single-dimensional barcode, for example, the smallest width of a bar or space element of a bar code may be designated as a single element of an array. If the bar code has a width of 256 dots or pixels, and the smallest element of the bar code has a width of 4 dots or pixels, for example, a binary array having sixty four array elements (e.g., a1 a2, . . ., a64) may be used to represent the bar code format. Each array element is assigned a value depending on whether that portion of the bar code is part of a bar or a space. A bar, for example, may be designated as having a value equal to one (e.g., a1=1), and a space may be designated as having a value equal to zero (e.g., a32=0). The array may also alternatively be a two-dimensional array, such as a bit map, that may be easily displayed on a screen. In yet another example, the transmission information data may be encoded into a digital series corresponding to a bar code representation of the bar code type selected in block 24. Alternatively, the transmission information data may be encoded into any number of other formats that may correspond to the selected bar code type identified in block 24. The bar code format may also be compressed or encrypted, such as when the bar code format is to be transmitted from a remote source to the personal digital electronic device.

Optionally, the transmission information data may be displayed in static visual bar code form as shown in block 26. In this manner, a personal digital electronic device can provide the transmission information date as a static visual bar code, which may be readable by CCD scanners and some types of sequential bar code scanners. Other visual information may be displayed as well, such as, for example, a visual image of a product corresponding to the transmission information.

In block 27, a signal to simulate the reflection of a scanning beam being moved across a visual image of the bar code format of block 25 is generated from the bar code format. The simulated signal may be generated corresponding to an approximated or measured scanning rate. If the simulated signal is to be generated for a scanner such as a laser scanner that utilizes a scanning rate in the range of about 30 to about 60 scans per second, the simulated signal may be generated using a scan rate within that range of scan rates (e.g., about 45 scans per second). Other types of scanners such as supermarket scanners are much faster, scanning at a rate of about 3000 to about 6000 scans per second. The simulation signal should be generated using a scan rate within that range. Alternatively, the simulated signal may be generated using a variable scan rate that is swept throughout a range of scan rates. Alternatively, as described below with respect to an exemplary infrared transmitter/receiver pair, the scan rate of the scanning beam may be measured where a receiver is available to detect the scanning beam. In this case, once the scanning rate or rates are determined, the signal is generated in block 27 corresponding to this scan rate or rates.

In block 28, the simulated signal is transmitted as light pulses. For purposes of the present description, the term "light" refers to visible light and infrared light spectra. The term "pulse" refers merely to a change in light level; the characteristics of the change, i.e. the specific waveform shape, are not critical. The light pulses may be generated in any visible or infrared wavelength desired by any light source known in the art, such as an LED, a laser, an infrared transmitter, a backlight of an LCD screen, or a light bulb.

Figure 12:
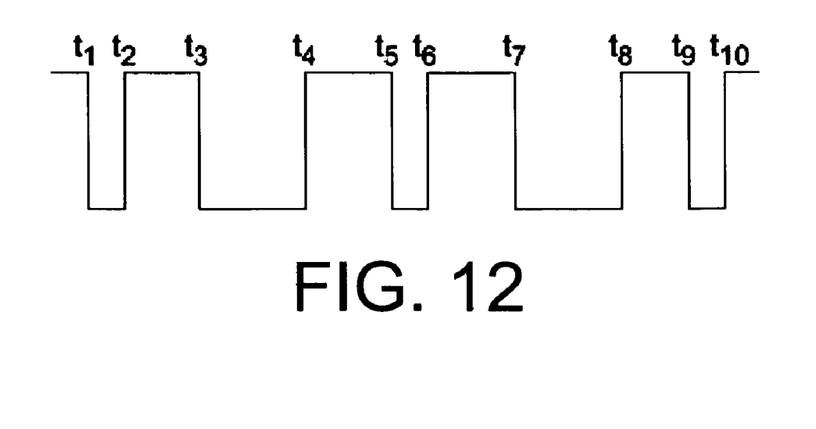
FIG. 12 is a graph of a characteristic of a signal representing the bar code of FIG. 10 against time.

FIG. 12 shows an idealized representation of a signal that may be generated in block 27 of FIG. 11 for actual transmission as light pulses in block 28, by which is created light corresponding to the reflection of a scanning beam off bar code 10 (FIG. 10). The one-dimensional bar code 10 includes a quiet zone 12, bars 14, and spaces 16. While FIG. 10 shows a quiet zone 12 being lighter, the quiet zone may alternatively be darker if the scanner is adapted to recognize it. Correspondingly, the bars 14 and the spaces 16 may be inverted such that the bars 14 are lighter than the spaces 16. As a scanning beam scans across the quiet zone 12 and the spaces 16, the beam is reflected to the scanner. As the beam scans across the bars 14, however, the beam is absorbed (or at least the reflected beam has a lower amplitude than the beam reflected from the lighter quiet zone 12 and spaces 16). Thus, the amplitude of the beam received at the scanner decreases at times t1, t3, t5, t7, and t9, which correspond to the beam reaching a leading edge of a bar 14, and increases at time t2, t4, t6, t8, and t10, which correspond to the beam reaching the falling edge of a bar 14.

Transmission information data encoded in a bar code format may be actively provided to a sequential bar code scanner by providing a light-based representation of a signal, such as shown in FIG. 12, to a scanner, instead of providing a potentially less reliable static bar code image to the scanner. Since many bar code scanner receivers will receive visual wavelength signals, personal digital electronic devices that have components that operate at these wavelengths can be used to provide an active light representation of the simulated reflected scanning beam to a sequential bar code scanner. The transmission information data may thus be actively provided to current or improved sequential bar code scanners without the requirement of altering the existing bar code scanner infrastructure.

When the bar code scanner receives the beam, the scanner decodes the on/off sequence of the beam to determine the transmission information data being provided, in a manner known in the art.

Sequentially providing such a signal to a sequential bar code scanner further allows for the transmission of bar code information without regard to the physical size and/or resolution limitations of the device display. A bar code representation that might otherwise require an unreasonably wide screen to convey all the information to the scanner, for example, may be provided directly to the scanner in one step from even the narrowest of screens.

Figure 13:
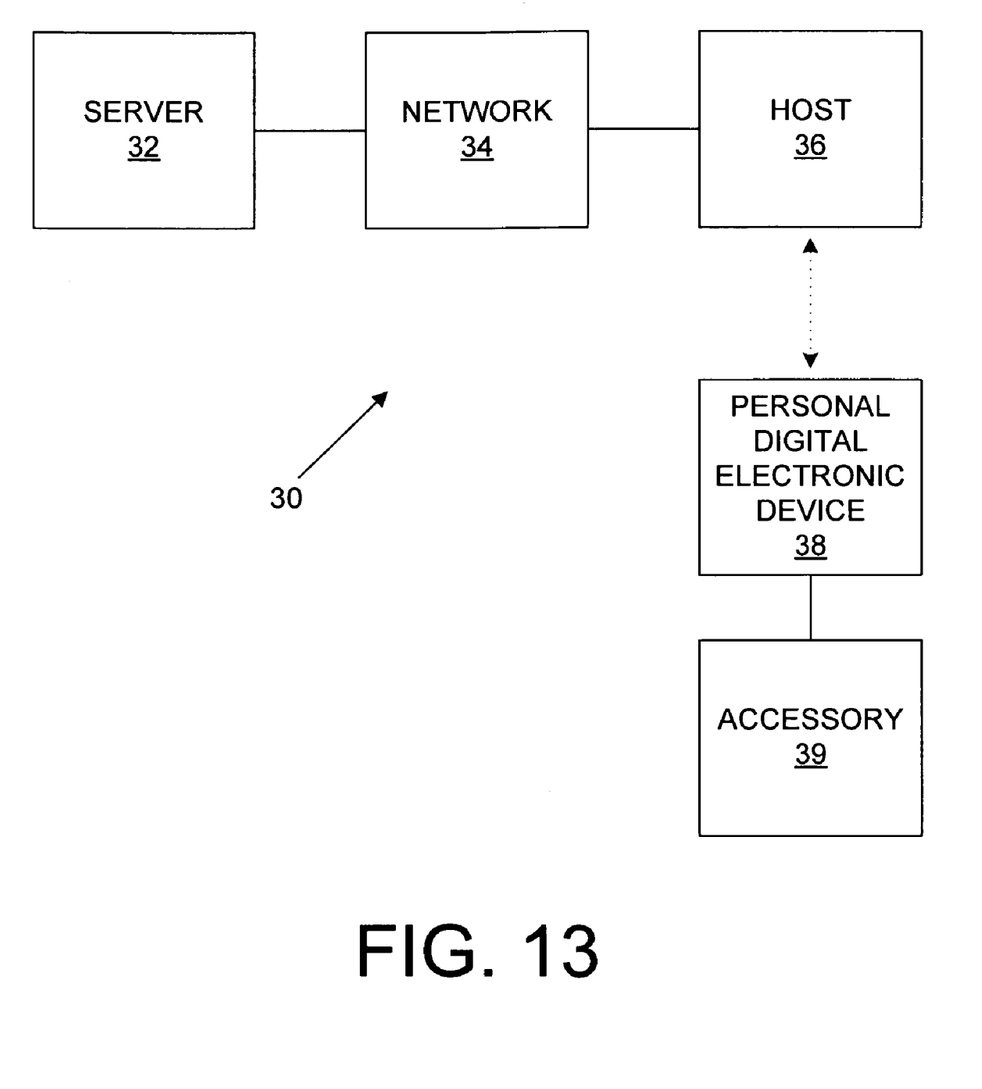
FIG. 13 is a schematic block diagram of a system for providing transmission information data to a bar code scanner from a personal digital electronic device.

FIG. 13 shows a schematic representation of one implementation of a system 30 for providing transmission information data to a bar code scanner from a personal digital electronic device. Server 32 is connected to a host 36 via a network 34, such as a local area network ("LAN"), a wide area network ("WAN"), an intranet, an extranet, the Internet, or other known network. The host 36 may also be a FM broadcast station capable of broadcasting RDS, as described elsewhere in this document. The host 36, in turn, is connected to the personal digital electronic device 38, such as through wireless technology, cellular technology, phone line, dedicated service line ("DSL"), cable connection, FM broadcast frequencies, or other known remote access technology. In one approach, for example, the server 32 may maintain a database of transmission information data items that are transmitted to the personal digital electronic device 38 via the host 36. A user of the personal digital electronic device may remotely select one or more transmission information data items, or the server 32 may provide a transmission information data item that has been selected for the user of the personal digital electronic device 38 either by the server 32 or some other system and communicated to the server, such as via the network 34. The server 32 retrieves the one or more transmission information data items from the database and provides the transmission information data to the personal digital electronic device 38 via host 36. In this approach, the personal digital electronic device 38 receives the transmission information data in block 20 (FIG. 11), and together with an accessory 39 (if needed) and depending on the particular communication protocol elected, performs the remaining operations depicted in blocks 22, 24, 25, 27, and 28.

Alternatively, some or all of the processing shown in blocks 20, 22, 24, 25, and 27 may be performed upstream of the personal digital electronic device 38, such as at server 32, at host 36, or at an intermediate location such as a component of network 34. For example, the server 32 may retrieve a transmission information data from a database, either on its own or in response to a request from the user of the personal digital electronic device 38, identify a bar code type (block 24), encode the transmission information data into a bar code format such as the array described above (block 25), and transmit the bar code format to the personal digital electronic device 38. If the personal digital electronic device 38 does not already have representative information to display on the screen of the device 38 (block 22), the server 32 may also provide this information to the personal digital electronic device 38. Information provided to the personal digital electronic device 38 may be encrypted and/or compressed as known in the art.

The techniques described herein are suitable for a great many different types of personal digital electronic devices, which include mobile communications devices, both of the type that are well known and commercially available today, as well as a myriad of new mobile communications devices that are likely to be introduced. These devices exhibit great variety in their user input capabilities and display capabilities. Examples of mobile communications devices include personal data assistants ("PDAs") operating under such operating systems as the Palm™ operating system and the Windows™ CE operating systems, a SmartPad notepad such as is available from Seiko Instruments of Torrance, Calif., and equipped with a wireless PDA device, two-way pagers, some types of consumer wireless Internet access devices ("CADs") and Internet appliances, mobile phones running Real Time Operating System (RTOS), Windows Mobile®, Linux or Symbian operating systems and running on basic or advanced Cellular networks such as 2G/2.5G networks (GPRS, EDGE, CDMA 1X) 3G/3.5G networks (UMTS, WCDMA, HSDPA, HSUPA, CDMA 2000, EV-DO) or even 4G networks to come such as LTE. These phones are usually internet enabled phones, and support either native C application downloads, Java™ applets downloads, or BREW® applications. Most of these phones are also BlueTooth enabled. These phones are available from various manufacturers such as Nokia of Helsinki, Finland, and Sony-Ericsson Mobile Communications, Inc. of Research Triangle Park, N.C., Motorola of Libertyville, Ill., Samsung and LG from Seoul, Korea. Further examples of electronic devices that may be used within the scope of the present invention include a communications-enabled personal data assistant, a Mobile Internet Device ("MID") as well as Personal Navigation Devices ("PND"). These devices can be connected to the internet via WiFi, WiMax, WiBro, or even Cellular networks. With the advent of Voice-over-IP (VoIP), these devices will also be able to double up as a mobile phone as well. Another illustrative platform is the Wireless Internet Device ("WID"), a type of device that includes the functionality of a phone as well as a PDA. A family of products with WID capabilities are now available from Nokia, Sony-Ericsson Mobile Communications, Inc. and other handset makers running either the Symbian Operating System or the Windows Mobile operating system. Any suitable wireless technology may be used, including, for example, GPRS, EDGE, UMTS, WCDMA, HSDPA, HSUPA, CDMA 1X, EV-DO, CDMA2000 and LTE. These devices can also connect to the internet through a non-cellular network such as a WiFi or a WiMax connection. They are known as Dual Mode devices as they can connect to the internet via either the cellular network or the WiFi network. Examples of user input capabilities offered by these devices include keypad, keyboard, stylus, ink, handwriting recognition, voice recognition, and so forth.

The techniques describe herein also benefit other types of personal digital electronic devices, whether or not provided with wireless communications capability. Examples of devices that have no or inadequate wireless communications capability include some personal digital assistants; some gaming devices; many audio and video players (including the popular iPod® mobile digital devices available from Apple Computer Corporation of Cupertino, Calif., USA, and the Zen MicroPhoto MP3 player available from Creative Labs Inc. of Milpitas, Calif., USA); most fobs; and USB Flash drives. Others have a variety of communications options. The Playstation® Portable device available from Sony Computer Entertainment America Inc. of Foster City, Calif., USA, for example, has Wi-Fi, USB, memory stick, and infrared I/O capabilities, any one of which may be used to receive a coupon. The Zune™ player available from Microsoft Corporation of Redmond, Wash. USA has Wi-Fi which may be used to receive a coupon.

The various embodiments of the invention described herein are illustrative of our invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A personal digital electronic device comprising:
a controller;
a broadcast band radio receiver coupled to the controller;
a light source coupled to the controller; and
a memory coupled to the controller, wherein the memory comprises program components executable by the controller for:
receiving an information field comprising transmission information data from a radio data system ("RDS") transmission in a broadcast channel transmission, the information field which comprises the transmission information data being independent of standard RDS information fields;
storing the transmission information data in the memory; and
transmitting the transmission information data from the memory as active light from the light source.

2. The personal digital electronic device of claim 1 wherein the transmitting program component comprises:
encoding the transmission information data from the memory into a bar code format;
generating a simulated signal from the bar code format; and
applying the simulated signal to the light source to transmit the simulated signal as active light.

3. The personal digital electronic device of claim 1 wherein:
   the light source is a light emitting diode; and
   the transmitting program component comprises transmitting the transmission information data from the memory as active light from the light emitting diode.

4. The personal digital electronic device of claim 1 further comprising:
   a display screen coupled to the controller;
   wherein the transmitting program component comprises transmitting the transmission information data from the memory as active light from the display screen.

5. The personal digital electronic device of claim 1 further comprising a fob housing, wherein:
   the light source is a light emitting diode;
   the transmitting program component comprises transmitting the transmission information data from the memory as active light from the light emitting diode; and
   the controller, the light emitting diode, and the memory are contained by the fob housing.

6. A method of operating a personal digital electronic device having a controller, a broadcast band radio receiver coupled to the controller, a light source coupled to the controller, and a memory coupled to the controller, comprising:
   receiving an information field comprising transmission information data from a radio data system ("RDS") transmission in a broadcast channel transmission, the information field which comprises the transmission information data being independent of standard RDS information fields;
   storing the transmission information data in the memory; and
   transmitting the transmission information data from the memory as active light from the light source.

* * * * *